(12) United States Patent
Tonga et al.

(10) Patent No.: US 7,748,973 B2
(45) Date of Patent: Jul. 6, 2010

(54) MOLD WITH AN INSERT FOR A CONTAINER BLOW MOLDING MACHINE

(75) Inventors: Jules Tonga, Octeville sur Mer (FR); Lionel Dubos, Octeville sur Mer (FR); Marc Leroux, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 489 days.

(21) Appl. No.: 11/667,955

(22) PCT Filed: Nov. 14, 2005

(86) PCT No.: PCT/FR2005/002815

§ 371 (c)(1),
(2), (4) Date: May 17, 2007

(87) PCT Pub. No.: WO2006/053970

PCT Pub. Date: May 26, 2006

(65) Prior Publication Data

US 2008/0118599 A1 May 22, 2008

(30) Foreign Application Priority Data

Nov. 18, 2004 (FR) .................................. 04 12258

(51) Int. Cl.
*B29C 49/64* (2006.01)
(52) U.S. Cl. ........................ 425/195; 249/79; 249/102; 425/522; 425/526
(58) Field of Classification Search ................. 425/182, 425/195, 522, 526; 249/79, 102, 155
See application file for complete search history.

(56) References Cited

U.S. PATENT DOCUMENTS

| 2,269,553 | A | * | 1/1942 | Roessler | 425/526 |
| 3,807,928 | A | * | 4/1974 | Horberg et al. | 425/526 |
| 3,978,910 | A | * | 9/1976 | Gladwin | 249/79 |
| 4,279,401 | A | * | 7/1981 | Ramirez et al. | 249/139 |
| 4,822,543 | A | | 4/1989 | Iizuka et al. | |
| 5,255,889 | A | * | 10/1993 | Collette et al. | 249/102 |
| 7,338,272 | B2 | * | 3/2008 | Miller | 425/182 |

FOREIGN PATENT DOCUMENTS

| DE | 36 13 543 C1 | | 12/1986 |
| EP | 0 976 517 A2 | | 2/2000 |
| GB | 2240300 A | * | 7/1991 |
| JP | 58-36418 A | | 3/1983 |
| JP | 11-300748 A | | 11/1999 |

* cited by examiner

*Primary Examiner*—Robert B Davis
(74) *Attorney, Agent, or Firm*—Sughrue Mion, PLLC

(57) ABSTRACT

The invention relates to a mould (1) for a machine that is used to blow mould containers. The invention comprises: a wall (3) defining a cavity (4) which is distributed around a main axis, said wall (3) being equipped with passages (6, 7) for the circulation of a heat-transfer fluid inside the wall (3); and at least one mould insert (8) which is mounted to the wall (3), said insert being equipped with at least one conduit (17, 23) which is connected to a passage in the wall (3).

15 Claims, 9 Drawing Sheets

MOLD WITH AN INSERT FOR A CONTAINER BLOW MOLDING MACHINE

The invention relates to container blow molding. More particularly, it relates to a mold for a container blow molding machine, which blow molding is carried out by introducing a pre-heated parison (generally formed from thermoplastic material) into the mold, then placing the parison under pressure to provide it with the desired shape in the mold.

The skilled person is aware that blow molding is not carried out in the abstract, but that the operations carried out during blow molding (such as whether or not the container in the mold is heat treated, optionally cooling the container on leaving the mold, etc) and the machine parameters (such as the temperature of the mold) depend on the intended use of the container.

Thus, certain applications require the mold to be cooled: this applies, for example, when fabricating containers intended to receive still water.

In contrast, other applications require the mold to be heated: hence, hot filling (for example, with liquids such as tea, pasteurized fruit juice, etc) or pasteurizing the contents assumes that the mold is heated to a predetermined temperature to heat fix the material, the parameters for adjusting the temperature of the mold depending on the temperature of the filling liquid or the pasteurization conditions.

The temperature of the mold (cooling or heating) is adjusted by circulating a heat transfer fluid (for example city supply water or cooled water when cooling; hot water or oil when heating, the choice of fluid depending on the temperature to be reached) in passages provided in the wall of the mold, around the molding cavity.

Further, the skilled person is aware that hot filling or pasteurizing may cause substantial deformation of the container, which depends on the temperature of the liquid on filling or the pasteurization parameters, even if the container has previously undergone heat fixing treatment to render it heat resistant, which deformation may be irreversible to a greater or lesser extent, so that it does not completely disappear after the liquid has cooled. Hence, a liquid at (or heating the container to) a temperature of 80° C. causes the container to expand more than it would with a liquid at a temperature of 60° C.; further, even if the hot-filled or pasteurized container does not deform during filling or pasteurization, the internal pressure drop which accompanies cooling of the contents (after sealing) could cause a reduction in the volume of the container, which may result in contraction of certain zones of the container walls.

In order to at least partially overcome these disadvantages, it has in the past been proposed to anticipate residual deformation of the container following hot-filling or pasteurization and/or cooling by providing a molding insert in the mold, which insert can form deformation zones (panels or the like) on the container and may be positioned differently depending on the envisaged variation in the volume of the container during filling, to compensate for that deformation.

That solution means that the same mold can be used for containers that have similar shapes but that are intended to receive liquids at different temperatures or that undergo different heat treatments: under such circumstances, the containers are different at the end of blow molding, but become identical or similar following filling and/or cooling.

The use of inserts in applications other than hot filling or pasteurization is known, namely for containers which, a priori, are not susceptible of undergoing a treatment that might result in their deformation after their fabrication. That applies, for example, when, starting from a common basic shape, a manufacturer wishes to diversify in order to produce different series of containers with differences that may lie in details regarding the shape (the position of molded patterns such as logos, which differ from one series to another) and/or in volume: a known example relates to producing series of promotional containers of volume that is greater than the basic volume, so that inserts are used to increase the height of the containers of such series.

However, especially in the zone of the inserts, the use of inserts for any reason suffers from problems with the uniformity of thermal regulation of the mold. Such an absence of uniformity can in all configurations result in a problem with forming the containers properly, i.e. containers in which the distribution of material is optimized. Further, with containers intended to be hot filled or pasteurized, such problems with thermal regulation may result in the appearance of residual stresses in the container that are expressed during filling or pasteurization by non-recoverable deformation that deleteriously affects the behavior and/or final appearance of the container.

The aim of the invention is to overcome the above-mentioned disadvantages, by proposing a solution that can optimize thermal regulation of the mold during blow molding.

To this end, the invention proposes a mold for a container blow molding machine, said mold comprising:
  a wall defining a cavity distributed about a main axis, said wall being provided with passages for circulating a heat transfer fluid within the wall;
  at least one molding insert mounted on the wall, said insert being provided with at least one duct that communicates with a passage of the wall.

In this manner, heat transfer fluid can circulate in the molding insert, which is thus brought to substantially the same temperature as the wall of the mold.

Thus, it is possible to obtain a substantially uniform temperature of the mold during blow molding. This is beneficial to the mechanical stability of the container during hot-filling, since the mold can be heated substantially uniformly.

In one embodiment, said duct is in the form of a groove hollowed into a face of the insert turned towards the wall; it may meander, to enhance heat exchange.

In one embodiment, the position of the insert can be adjusted perpendicular to the main axis of the wall, and to this end the mold also comprises at least one adjusting shim, interposed between the wall and the insert, said shim being pierced by at least one port that opens onto a passage in the wall and onto a duct in the insert.

Thus, for the same insert, it is possible to adjust the position thereof as a function of the needs defined above, without deleteriously affecting the circulation of the heat transfer fluid.

Said shim is, for example, in the form of a plate having a contour that follows that of the insert, which may be provided with projecting pins that pass through positioning holes pierced in the shim.

In one embodiment, the wall of the mold is provided with at least two passages, namely a primary passage and a secondary passage, the insert being provided with at least two ducts, namely a primary duct and a secondary duct.

In one embodiment, the shim is pierced by at least two ports, namely a primary port that opens onto the primary passage and onto the primary duct, and a secondary port that opens onto the secondary passage and onto the secondary duct, the ports providing a properly dimensioned cross section of flow for the heat transfer fluid.

The primary port is, for example, in the form of an oblong hole, while the secondary port may be in the form of a circular hole.

The wall of the mold is, for example, hollowed by a recess in which the shim and insert are received, and into which at least one passage in the wall may open, facing a port in the shim.

Further, in one embodiment, the shim may be in the form of a set of laminated peel-off shims.

Other objects and advantages of the invention become apparent from the following description made with reference to the accompanying drawings in which:

FIG. 1 shows a portion of a mold 1 intended to equip a blow molding machine (not shown), to blow-mold containers (not shown).

The portion of mold 1 which is shown is in fact a portion of a half-mold 2, intended to satisfy a particular requirement for the container to be formed, said need (an example of which is given below) possibly varying from one container to another and requiring adjustments that are difficult to make with a one-piece mold.

As explained below, the half-mold 2 shown comprises an attached insert; it is assembled with another half-mold (not shown) which, to form the body of the container, may be either identical with the half-mold 2 (i.e. it may also include an attached insert) or it may be different (i.e. it is a single piece, for example), the two half-molds being completed by a mold base element to form the base of the container, the assembly thus forming a complete mold.

The mold 1 includes a wall 3 that is made of steel or, as is preferable, of an aluminum alloy, and defines a cavity 4 (produced by precision machining) intended to receive a parison (not shown)—also termed a preform—of thermoplastic material, which has been heated to a temperature sufficient to allow it to deform during blow molding before introducing it into the mold 1.

Figure 1:
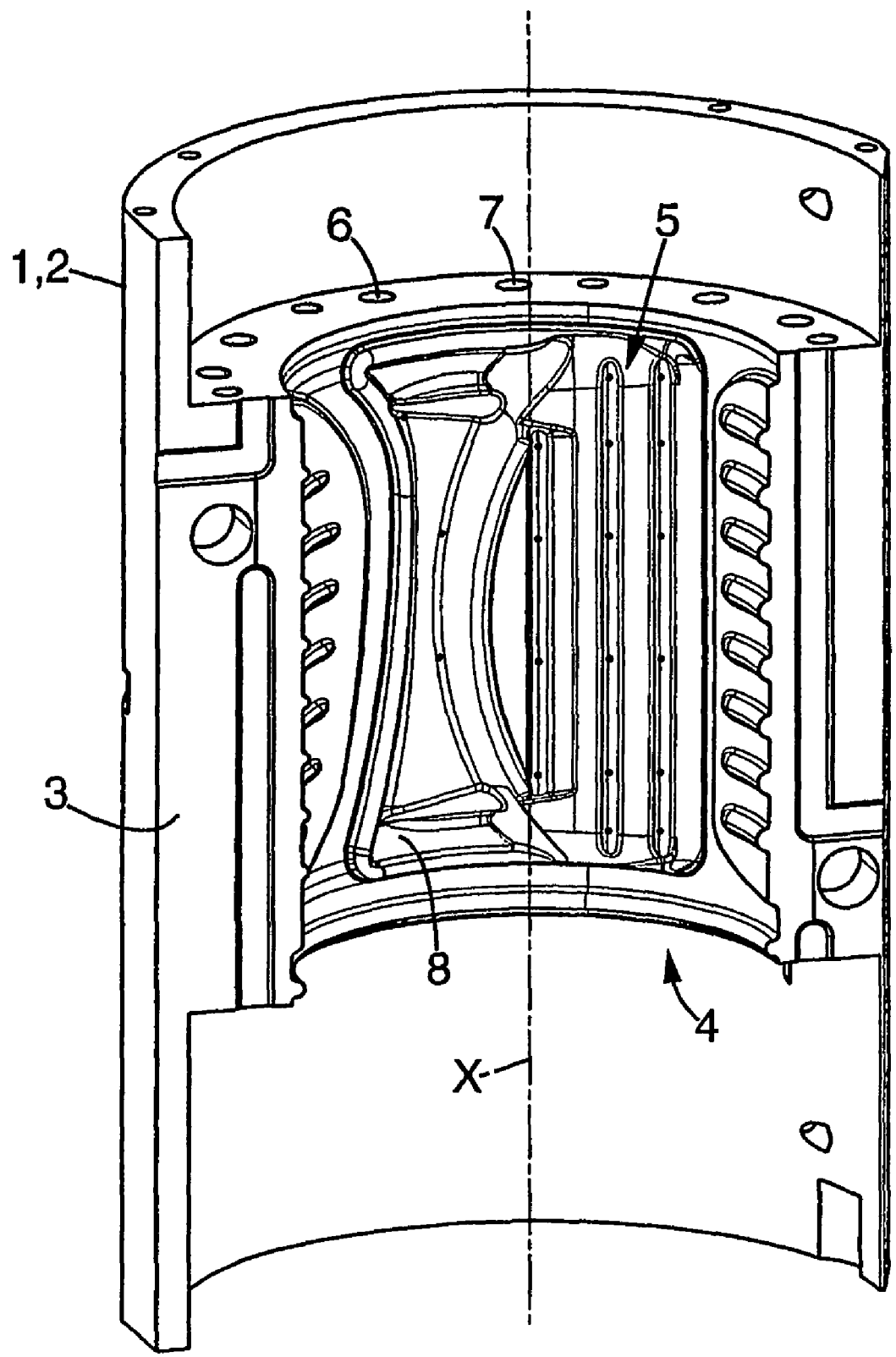
FIG. 1 is a fragmentary perspective view showing a portion of a mold of the invention.

As can be seen in FIG. 1, the cavity 4, which is shown in part in this figure, is generally distributed about a main axis X which, in defining a longitudinal direction, extends along the largest dimension of the cavity 4 (i.e. of the container), with the exception of a zone 5 in which a ribbed profile intended to facilitate gripping is to be formed on the container during blow molding.

As can also be seen in FIG. 1, the wall 3 of the mold 1 is provided with passages 6, 7 intended to allow circulation of a heat transfer liquid within the wall 3 to regulate the temperature of the mold 1.

Said passages 6, 7 are in the form of a plurality of parallel bores pierced longitudinally into the wall 3, and distributed over the periphery thereof.

Continuity of the heating circuit formed by passages 6, 7 is ensured by perforations (not shown) connecting the passages 6, 7 and produced in an upper portion of the mold, intended, it should be recalled, to form the shoulder of the container, not shown in the figures.

Said passages include a primary passage 6 in which the heat transfer fluid circulates from bottom to top of the mold 1, for example, and a secondary passage 7, adjacent to the primary passage 6 and connected thereto in the upper portion of the mold 1, in which secondary passage 7 the heat transfer fluid flows in the reverse direction, from top to bottom of the mold 1.

In the zone 5 where the profile is to be produced in the container, the mold 1 includes a molding insert 8 mounted on the wall 3, in a position relative thereto that can be adjusted transversely, i.e. perpendicular to the main axis X.

In one embodiment, to allow the position of the insert 8 to be adjusted, the mold 1 also includes an adjusting shim 9 interposed between the wall 3 and the insert 8.

The thickness of said shim 9, which is in the form of a plate having a contour that substantially matches that of the insert 8, is selected as a function of the envisaged variation in volume of the container during its subsequent filling.

Thus, depending on the temperature of the filling liquid, the thickness of said shim 9 may be selected to be 1 mm [millimeter], 1.5 mm, or 2 mm, said thickness in practice increasing with increasing temperature of the liquid.

Said shim 9 may be machined as a function of a particular defined requirement for the container to be formed. However, instead of fabricating the shim, it may be opportune to form the shim as a set of peel-off shims in the form of laminated sheets that are peeled off as a function of the desired size.

Such peel-off shims are commercially available and the skilled person could simply have a set of shims fabricated with the desired dimensions.

Figure 2:
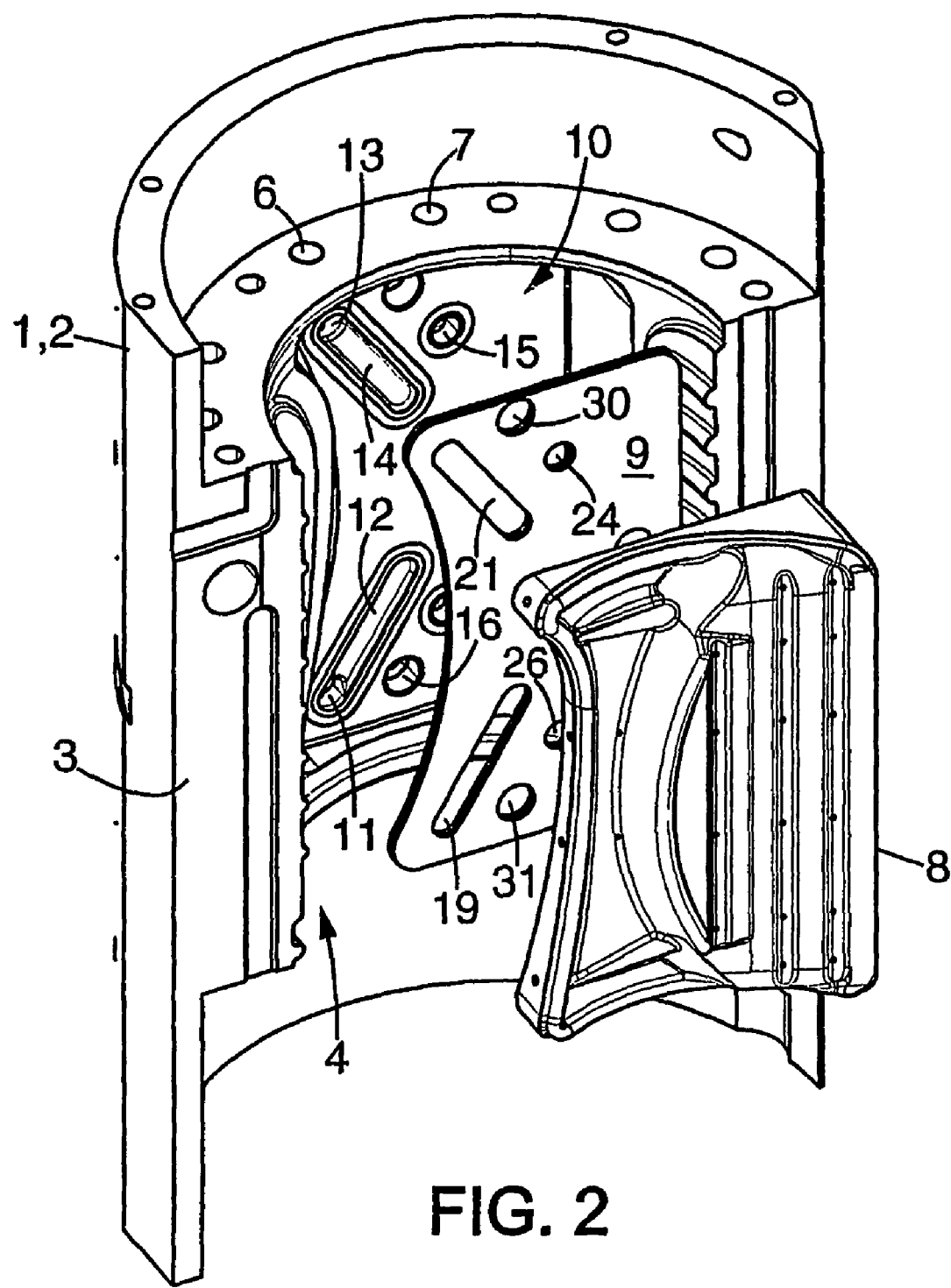
FIG. 2 is an exploded perspective view of the FIG. 1 mold part.
Figure 3:
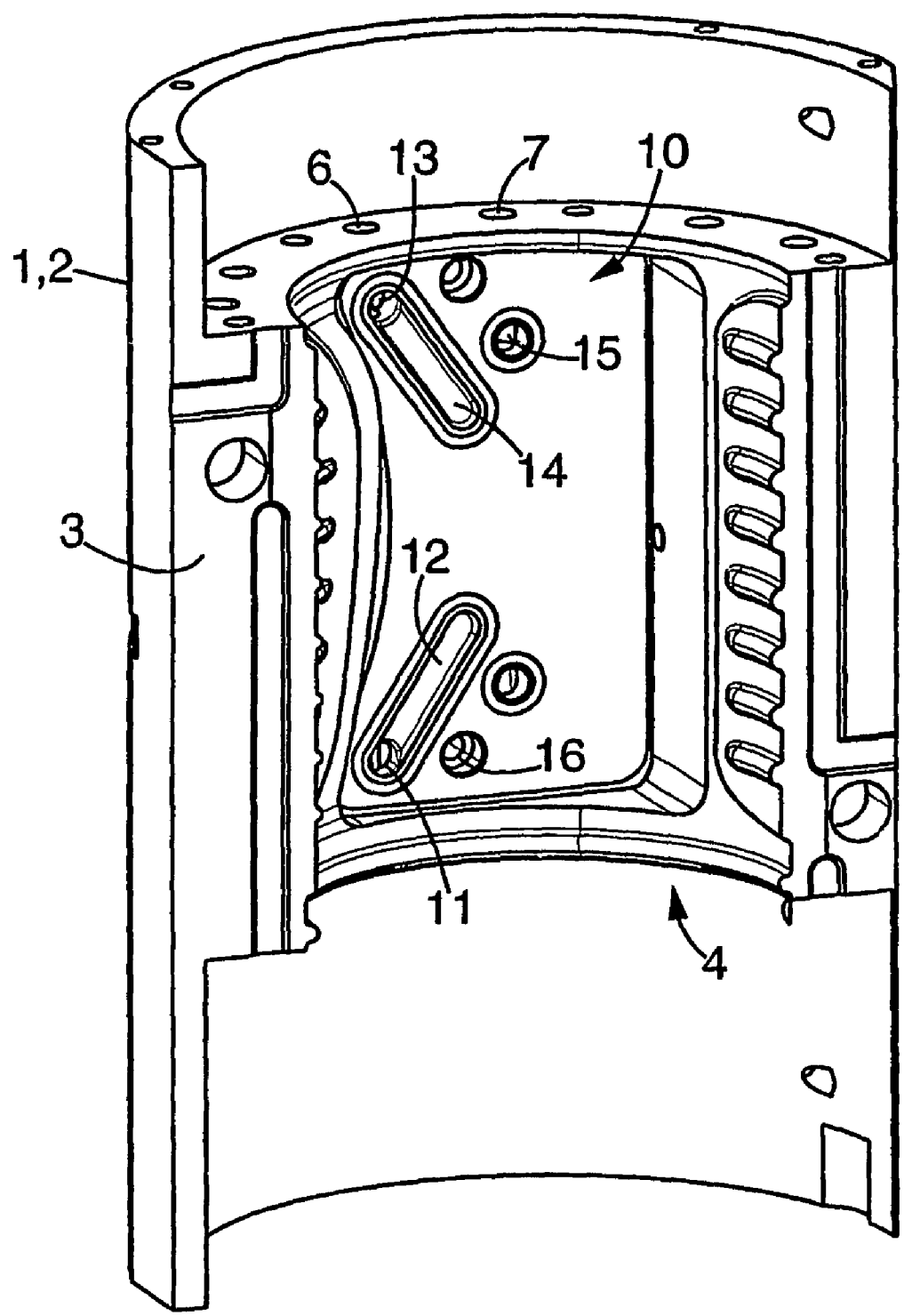
FIG. 3 is a view similar to FIG. 1, showing neither the molding insert nor its shim.
Figure 4:
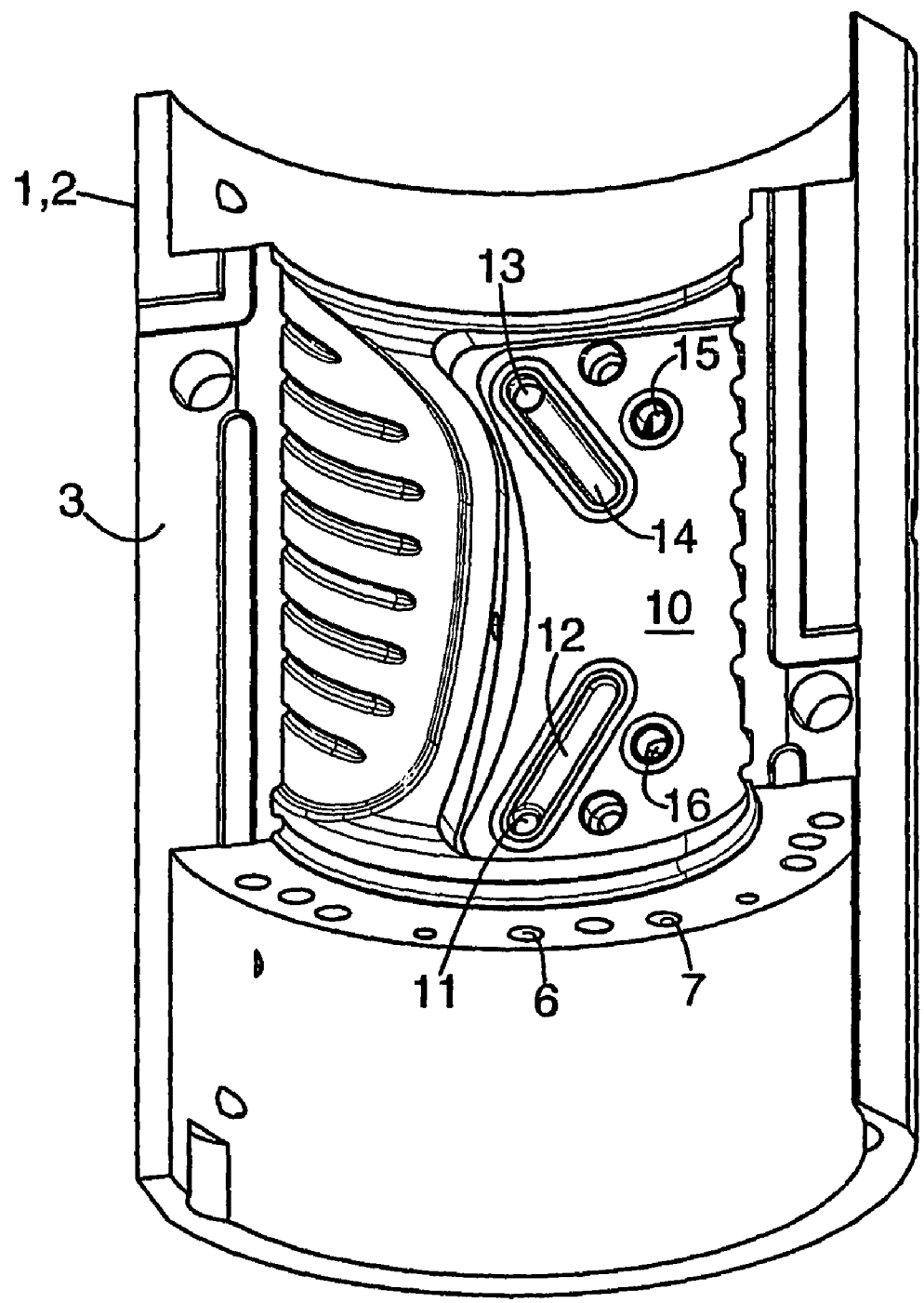
FIG. 4 is a perspective view of the FIG. 3 mold portion, from another viewpoint.

As can be seen in FIGS. 2 to 4, a recess 10 is hollowed into the wall 3 of the mold 1 and receives the shim 9 and the insert 8 together, the contour of said recess 10 being complementary to that of the insert 8.

As shown in FIG. 3, the primary passage 6 opens, into the recess 10 via two openings, namely a lower primary opening 11 which is extended by a lower groove 12, hollowed obliquely in the wall 3, and an upper primary opening 13, which is extended by an upper groove 14, also hollowed obliquely into the wall 3; as described below, these openings 11, 13 are placed in communication when the shim 9 and the insert 8 are put into position.

Similarly, the secondary passage 7 opens into the recess 10 via two openings, namely an upper secondary opening 15 and a lower secondary opening 16 which are also placed in communication when the shim 9 and insert 8 are put in position.

In order to produce a uniform temperature in the mold 1 when blow-molding the parison, the shim 9 and the insert 8 are arranged to allow a heat transfer fluid to circulate inside the insert 8. In fact, the passages 6, 7, interrupted in the recess 10, are extended into the shim 9 and the insert 8.

To this end, the insert 8 is provided with a primary duct 17 in the form of a groove pierced in one face 18 of the insert 8 termed the back face, turned towards the shim 9 (i.e. towards the wall 3), which is pierced by a lower primary opening or port 19 in the form of an oblong hole which, when the shim 9 is in place in the recess 10 between the wall 3 and the insert 8, is facing the lower primary opening 11 and thus opens onto the primary passage 6 produced in the wall 3, said lower primary port 19 also opening onto a lower, oblique, portion 20 of the primary duct 17.

The shim 9 is also provided with an upper primary opening or port 21 in the form of an oblong hole which, when the shim 9 is in place in the recess 10 between the wall 3 and the insert 8, is facing the upper primary opening 13 and thus opens onto the primary passage 6 produced in the wall 3, said upper primary port 21 also opening onto an upper, oblique, portion 22 of the primary duct 17.

Figure 5:
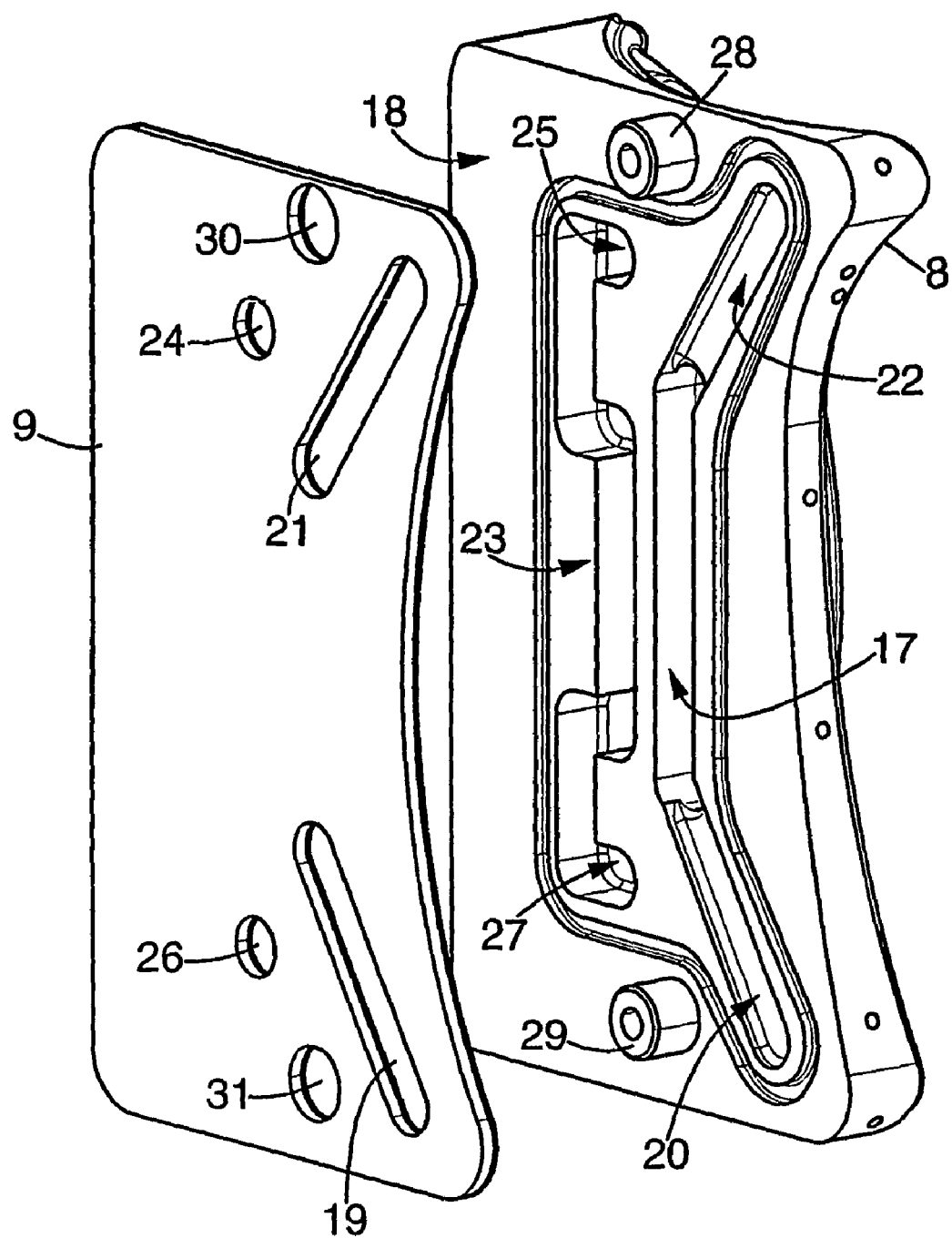
FIG. 5 is an exploded perspective view showing a molding insert and its shim for a mold of the invention.
Figure 6:
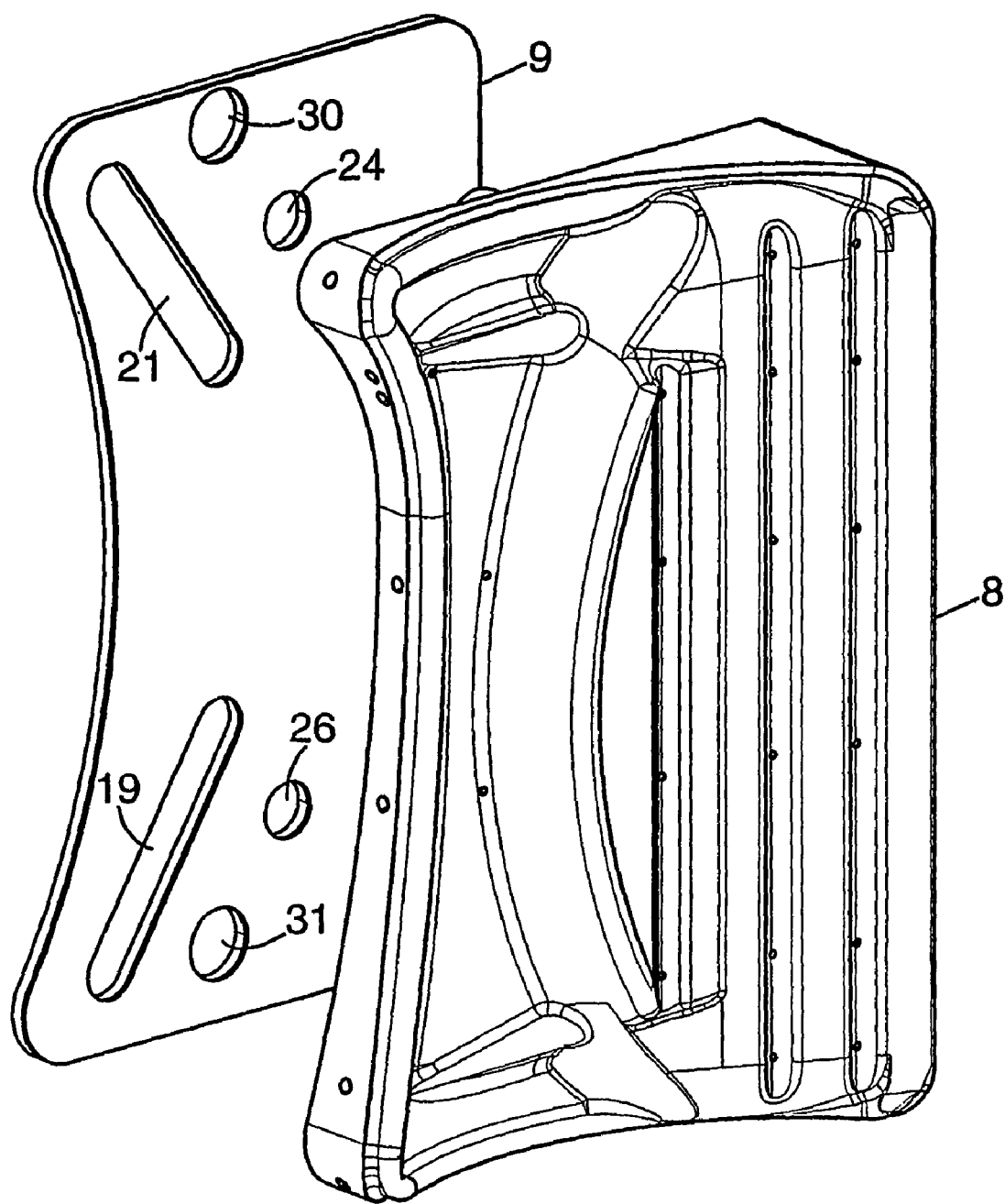
FIG. 6 is an exploded perspective view showing the insert and the shim of FIG. 5, from another viewpoint.

Further, as can be seen in FIG. 5 in particular, the insert 8 is provided with a secondary duct 23 in the form of a groove pierced in the rear face 18 of the insert 8, the shim 9 being pierced by an upper secondary port 24 in the form of a circular hole which, when the shim 9 is in place in the recess 10 between the wall 3 and the insert 9, is facing the upper secondary opening 15 and thus opens onto the secondary passage 7 formed in the wall 3, said upper secondary port 24 also opening onto an upper portion 25 of the secondary duct 23.

The shim 9 is also provided with a lower secondary port 26 in the form of a circular hole which, when the shim 9 is in place in the recess 10 between the wall 3 and the insert 8, is facing the lower secondary opening 16 and thus opens onto the secondary passage 7, said lower secondary port 26 also opening onto a lower portion 27 of the secondary duct 23.

Figure 9:
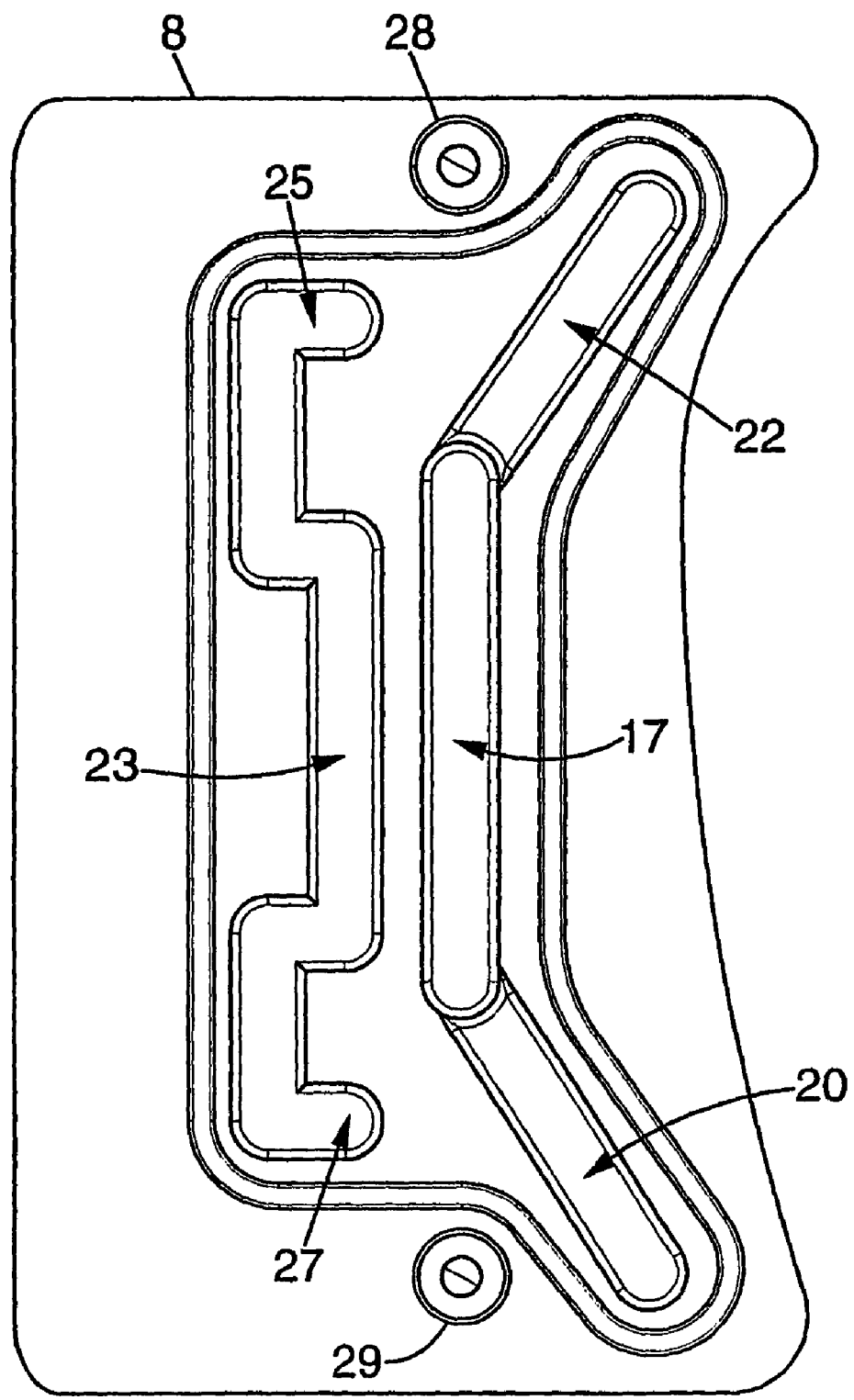
FIG. 9 is a plan view showing a molding insert for a mold of the invention.

As can clearly be seen in FIGS. 5 and 9, the ducts 17, 23 in the insert 8 meander, to allow better distribution of the heat exchange between the heat transfer fluid and the bulk of the insert 8.

Further, as can also clearly be seen in FIG. 5, the ducts 17 and 23 are not uniform in depth: this is due to the shape of the insert 8, the thickness of which is not uniform measured perpendicularly to the main axis X: it is thinner in its upper and lower portions (ducts 17 and 23 thus being shallower), and it is thicker in the center (ducts 17 and 23 thus being deeper). The oblong ports formed in the shim 9, which follow the shallowest portions of ducts 17 and 23, can thus guarantee a minimum flow cross section for the heat transfer fluid to avoid head losses along the fluid circuit.

When the shim 9 and the insert 8 are in place in the recess 10, the lower groove 12 is facing the lower primary port 19 and the lower portion 20 of the primary duct 17, while the upper groove 14 is facing the upper primary port 21 and the upper portion 22 of the primary duct 17.

Further, the upper secondary opening 15 is facing the upper secondary port 24 and the upper portion 25 of the secondary duct 23, while the lower secondary opening 16 is facing the lower secondary port 26 and the lower portion 27 of the secondary duct 23.

Thus, while ensuring continuity, the circulating heat transfer fluid circuit is diverted into both the primary passage 6 and the secondary passage 7, the diverted fluid being used to advantage to bring the insert 8 to the same temperature as the wall 3.

This diversion occurs regardless of the thickness of the shim 9, with the ports 19, 21, 24, 26 that are formed therein ensuring transit of heat transfer fluid from the wall 3 to the insert 8, and vice versa.

Figure 7:
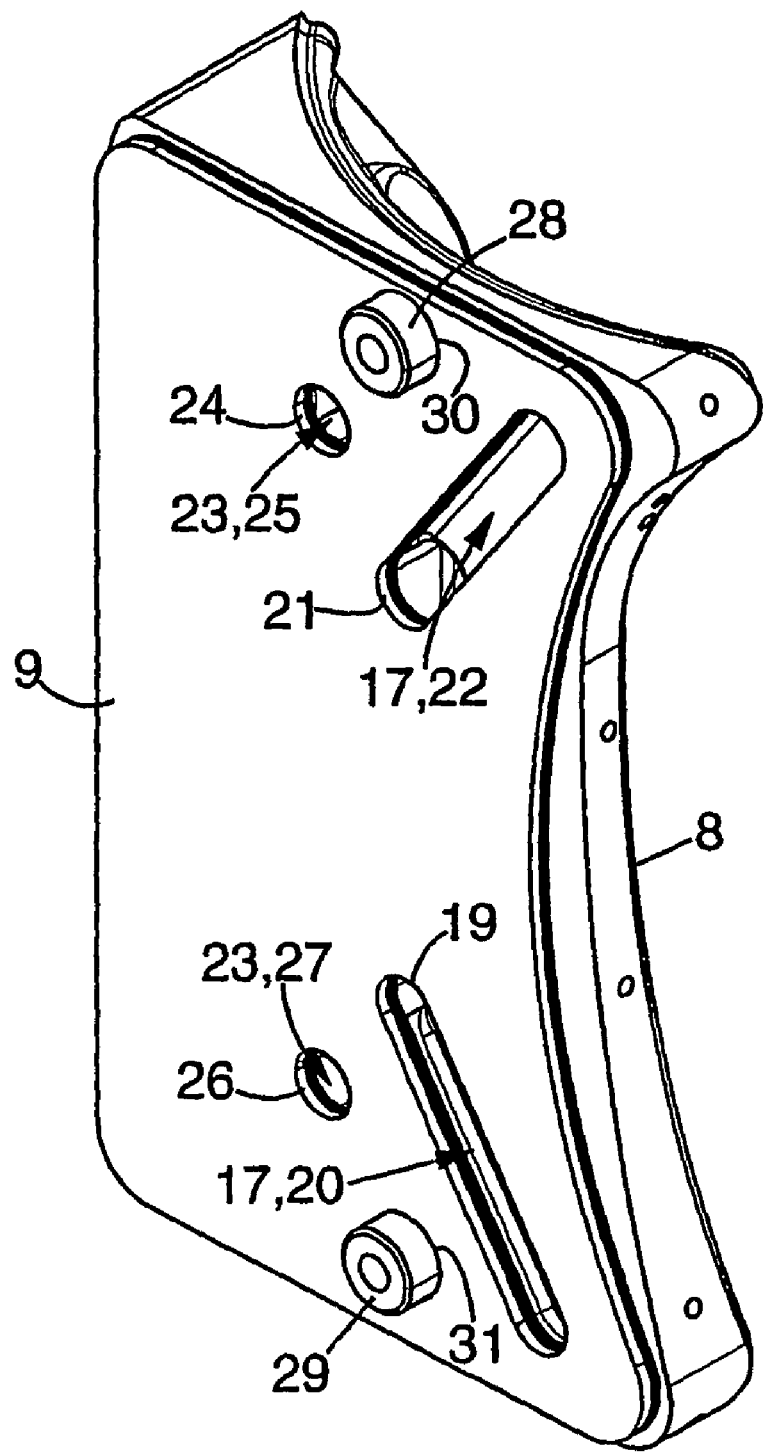
FIG. 7 is a perspective view showing the assembled insert and shim.
Figure 8:
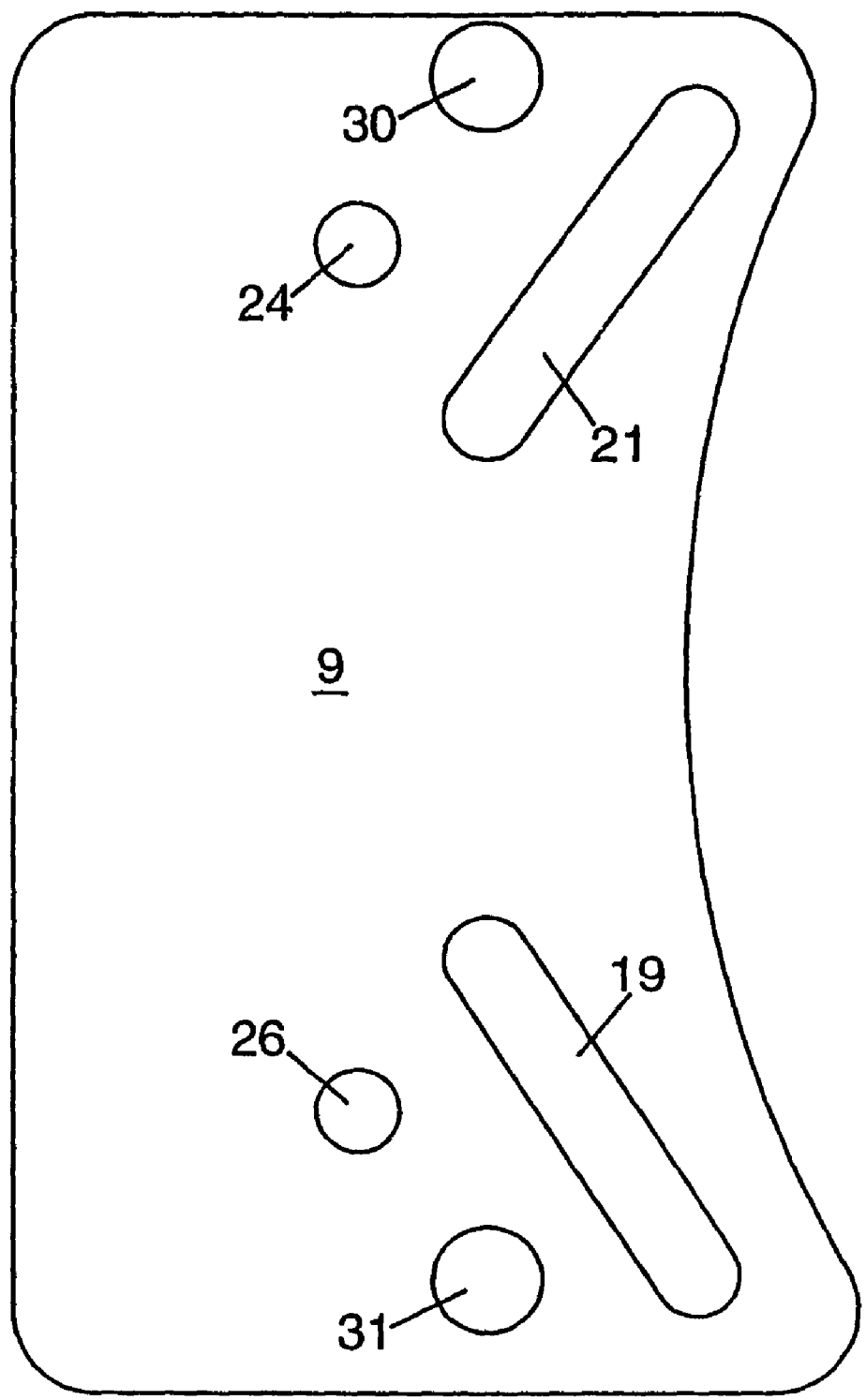
FIG. 8 is a plan view showing a shim for a mold of the invention.

Further, as shown in FIGS. 5 and 7, the insert 8 is provided with projecting pins 28, 29 that pass through holes 30, 31 pierced in the shim 9, to allow precise positioning thereof relative to the insert 8 when positioning them together in the recess 10.

Precision machining of the mold 1 and more particularly of the recess 10, the shim 9, and the insert 8, can avoid having to position seals between the wall 3 and the shim 9, and between the shim 9 and the insert 8.

Although the description illustrates an embodiment in which the position of the insert 8 is adjusted using a shim, the invention is also applicable when a set of inserts of different depths (i.e. perpendicular to the axis X) is used to accommodate variations in the desired shape from one container to the other, in which case adjustment shims do not need to be used. Clearly, when the insert simply functions to allow production of a container shape which differs from a common basic shape, then shims no longer appear to be required.

However, even in the circumstances discussed here, shims may be used (in particular peel-off shims) to compensate for clearances linked to machining tolerances.

The invention claimed is:

1. A mold (1) for a container blow molding machine, said mold (1) comprising:
    a wall (3) defining a cavity (4) distributed about a main axis (X), said wall (3)
    provided with passages (6, 7) for circulating a heat transfer fluid within the wall (3); and
    at least one molding insert (8) mounted on the wall (3);
    wherein said insert (8) is provided with at least one duct (17, 23) that communicates with at least one of the passages (6, 7) of the wall (3); and
    wherein said mold comprises at least one shim for adjusting the position of the insert relative to the main axis, interposed between the wall and the insert, said shim pierced by at least one port that opens onto at least one of the passages in the wall and onto the at least one duct in the insert.

2. A mold (1) according to claim 1 wherein the shim (9) is in the form of a plate having a contour that follows that of the insert (8).

3. A mold (1) according to claim 1 wherein insert (8) is provided with projecting pins (28, 29) that pass through positioning holes (30, 31) pierced in the shim (9).

4. A mold (1) according to claim 1 wherein said wall (3) is provided with at least two passages (6, 7), namely a primary passage (6) and a secondary passage (7), in that the insert (8) is provided with at least two ducts (17, 23), namely a primary duct (17) and a secondary duct (23), and in that the shim (9) is pierced by at least two ports (19, 21, 24, 26), namely a primary port (19, 21) that opens onto the primary passage (6) and onto the primary duct (17), and a secondary port (24, 26) that opens onto the secondary passage (7) and onto the secondary duct (23).

5. A mold (1) according to claim 4, wherein the primary port (19, 21) is in the form of an oblong hole.

6. A mold (1) according to claim 4, wherein the secondary port (24, 26) is in the form of a circular hole.

7. A mold (1) according to claim 1, wherein a recess (10) is hollowed into the wall (3) of the mold, in which the shim (9) and the insert (8) are both received.

8. A mold (1) according to claim 7, wherein at least one passage (6, 7) in the wall opens into said recess (10) facing a port (19, 21, 24, 26) in the shim (9).

9. A mold (1) according to claim 1, wherein the shim (9) is in the form of a set of peel-off shims.

10. A mold (1) according to claim 1, wherein said duct (17, 23) is in the form of a groove hollowed into one face (18) of the insert (8) turned towards the shim (9).

11. A mold (1) according to claim 10, wherein said duct (17, 23) has meanders.

12. A mold for a container blow molding machine, comprising:
- a wall defining a cavity distributed about a main axis and comprising passages for circulating a heat transfer fluid;
- a molding insert for molding at least a body portion of the container, the molding insert mounted on the wall and comprising a duct that communicates with at least one of the passages of the wall; and
- a shim for adjusting the position of the molding insert relative to the main axis, the shim interposed between the wall and the molding insert and comprising a port opening onto at least one of the passages in the wall and onto the duct in the insert.

13. A mold for blow molding a container from a parison in a blow molding machine, comprising:
- a wall defining a cavity distributed about a main axis and comprising passages for circulating a heat transfer fluid;
- a molding insert for molding at least a portion of the container, the molding insert mounted on the wall and comprising a duct that communicates with at least one of the passages of the wall; and
- a shim for adjusting the position of the molding insert relative to the main axis, the shim interposed between the wall and the molding insert and comprising a port opening onto at least one of the passages in the wall and onto the duct in the insert, the shim positioned so as not to contact the parison during blow molding.

14. The mold according to claim 12, wherein the shim is in the form of a set of peel-off shims.

15. The mold according to claim 13, wherein the shim is in the form of a set of peel-off shims.

* * * * *